US012626453B2

(12) United States Patent
Ökvist et al.

(10) Patent No.: US 12,626,453 B2
(45) Date of Patent: May 12, 2026

(54) METHOD AND ARRANGEMENTS FOR GRAPHICALLY VISUALIZING DATA TRANSFER IN A 3D VIRTUAL ENVIRONMENT

(71) Applicant: Telefonaktiebolaget LM Ericsson (publ), Stockholm (SE)

(72) Inventors: Peter Ökvist, Luleå (SE); Tommy Arngren, Södra Sunderbyn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 245 days.

(21) Appl. No.: 18/289,721

(22) PCT Filed: May 7, 2021

(86) PCT No.: PCT/EP2021/062182
§ 371 (c)(1),
(2) Date: Nov. 6, 2023

(87) PCT Pub. No.: WO2022/233434
PCT Pub. Date: Nov. 10, 2022

(65) Prior Publication Data
US 2024/0257442 A1     Aug. 1, 2024

(51) Int. Cl.
*G06T 15/20*          (2011.01)
*G06F 3/01*           (2006.01)

(52) U.S. Cl.
CPC .............. *G06T 15/20* (2013.01); *G06F 3/012* (2013.01)

(58) Field of Classification Search
CPC ................................. G06T 15/20; G06F 3/012
See application file for complete search history.

(56) References Cited

U.S. PATENT DOCUMENTS

2009/0288007 A1    11/2009  Leacock et al.
2011/0225514 A1     9/2011  Goldman et al.
(Continued)

OTHER PUBLICATIONS

International Search Report and Written Opinion with Transmittal dated Feb. 3, 2022 issued in International Patent Application No. PCT/EP2021/062182 (15 pages).

*Primary Examiner* — Michelle Chin
(74) *Attorney, Agent, or Firm* — Rothwell, Figg, Ernst & Manbeck, P.C.

(57)          ABSTRACT

Method and arrangements (14; 15; 21; 500) for graphically visualizing data transfer (12; 13) on a first device (21) for a first user (31) that by means of the first device (21) is visually experiencing a 3D virtual environment (301) through a first person perspective, 1PP, field of view (302) from a first virtual location (371) in the 3D virtual environment (301). The first device (21) being configured to provide tracking between a real-world field of view orientation of the first user (31) and said 1PP field of view (302) in the 3D virtual environment (301). A data transfer (12; 13) is identified between a second device (21; 22) and a third device (23). It is graphically visualize (407), on the first user device (21), the identified data transfer in the 3D virtual environment (301) as a graphical flow (385; 385; 389) between a second virtual location (372; 371), associated with the second device (22), in the 3D virtual environment (301) and a third virtual location (373), associated with the third device (23). The first user (31) can thereby through said 1PP field of view visually experience the data transfer in the 3D virtual environment (301).

20 Claims, 7 Drawing Sheets

(56)          References Cited

U.S. PATENT DOCUMENTS

2015/0213650 A1      7/2015  Barzuza et al.
2015/0235433 A1*    8/2015  Miller ....................... G06T 7/73
                                                                345/633
2018/0061132 A1*    3/2018  Lanier ................... G06T 19/006
2020/0344131 A1    10/2020  Barton et al.
2021/0111972 A1      4/2021  Koutitas

* cited by examiner

601

503

602

14, 15, 21; 500

METHOD AND ARRANGEMENTS FOR GRAPHICALLY VISUALIZING DATA TRANSFER IN A 3D VIRTUAL ENVIRONMENT

CROSS REFERENCE TO RELATED APPLICATIONS

This application is a 35 U.S.C. § 371 National Stage of International Patent Application No. PCT/EP2021/062182, filed 2021 May 7.

TECHNICAL FIELD

Embodiments herein concern graphical visualization on a device for a user that by means of the device is visually experiencing a three dimensional (3D) virtual environment, such as a 3D extended reality (XR) environment, through a first person perspective, "1PP", field of view from a virtual location in the 3D virtual environment and where the device is configured to provide tracking between a real world field of view orientation of the user and said 1PP field of view in the 3D virtual environment.

BACKGROUND 3D extended reality (XR) environments, such as 3D virtual reality (VR), or 3D augmented reality (AR) environments, are today well known and have been used in various applications on both mobile and/or stationary devices, e.g. computers or game consoles with connected VR headsets, smart phones with or without VR headset integration, etc. The applications have for example been for informative, educational and/or entertainment purposes. A 3D XR environment may in general be considered a mixed reality environment that is a mix of the real world and a virtual world that a user is experiencing with some connection therebetween. It may also be described as an environment where digital, or virtual, objects have been brought into the physical world or that physical world objects have been brought into the virtual, or digital, world.

A device configured to provide experience of such 3D virtual environment provides graphical visualization on the device for a user that is using the device and by means of the device is visually experiencing the 3D virtual environment through a first person perspective (1PP) field of view from a virtual location in the 3D virtual environment. The means of the device providing the visual experience to the user may e.g. be or include a VR headset, XR or AR glasses or even contact lens(es), a smartphone, just to give some examples. An important subgroup of such applications and devices are those where it is utilized that the application and device provide tracking between a real-world field of view orientation of the user and said 1PP field of view in the 3D virtual environment. That is, where the user by physically moving the head, device and/or eyes to change the field of view in the real world, there is tracking of this and thereby a corresponding change of the 1PP field of view on the virtual environment. This is a typical way of how there is provided a connection between the real world and the virtual world, enhancing the experience of mix of the real and virtual worlds.

Virtual conference arenas or "rooms", where users connect for communication by means of text and/or voice and/or video with each other, have been around for even longer times than VR environments, although the number of users and the time spent in videoconference meetings have dramatically increased lately. Many meetings are held remotely via teleconference, where teleconference may be considered to include also video conference. There are several different video conferencing solutions existing today, such as Microsoft® Teams™, Skype®, Zoom® etc. They all offer ways to have virtual meetings that are fully distributed or connecting groups of participants in conference rooms equipped with cameras, screens and microphones, or combinations thereof.

There are also solutions, including e.g. some multiplayer computer games, where users meet and communicate in a 3D virtual environment, such as by means of VR headsets. Each user therein is typically represented by an avatar, e.g. a virtual person or game character, corresponding to a player in the game.

It has also been presented solutions where videoconferencing as above has been extended with 3D virtual meeting rooms or environments, in which the users are virtually represented and in which communication between users can take place, current examples are Spatial, AltspaceVR, MeetVR, RecRoom, This kind of solutions are expected to be increasingly common in the future with more accessible, improved and more cost efficient devices and means, e.g. VR headsets, XR contact lenses, and similar, that enable users to participate in such meetings. This expected development will also lead to more and more situations and various applications where users are experiencing 3D virtual environments, such as 3D XR environments.

People that have experienced 3D virtual environments, e.g. through VR headset, realize that there are both pros and cons with the experience of the mixed real and virtual worlds. It can be confusing, unpleasant or disturbing to the user in some aspects and situations that can occur, while at the same time this offers possibilities to inform users in many new and/or improved ways that are not possible in e.g. conventional 2D video conferencing and similar situations. It is desirable with solutions that enable to better utilize the advantages and/or that reduce drawbacks for users that experience 3D virtual environments as described above, e.g. that participate in a meeting in a 3D virtual environment with one or more other users that are physically located elsewhere.

SUMMARY

In view of the above, an object is to enable or provide one or more improvements or alternatives in relation to the prior art, such as provide improvements in how information is provided to a user visually experiencing a 3D virtual environment.

According to a first aspect of embodiments herein, the object is achieved by a method, performed by one or more devices, for graphically visualizing data transfer on a first device for a first user that by means of the first device is visually experiencing a 3D virtual environment through a first person perspective, 1PP, field of view from a first virtual location in the 3D virtual environment. Said first device being configured to provide tracking between a real-world field of view orientation of the first user and said 1PP field of view in the 3D virtual environment. Said device(s) identifies a data transfer between a second device and a third device. The device(s) then graphically visualizes, on the first user device, the identified data transfer in the 3D virtual environment as a graphical flow between a second virtual location, associated with the second device, in the 3D virtual environment and a third virtual location, associated with the third device, in the 3D virtual environment. The first user can thereby through said 1PP field of view visually experience the data transfer in the 3D virtual environment.

According to a second aspect of embodiments herein, the object is achieved by a computer program comprising instructions that when executed by one or more processors causes said one or more devices to perform the method according to the first aspect.

According to a third aspect of embodiments herein, the object is achieved by a carrier comprising the computer program according to the second aspect.

According to a fourth aspect of embodiments herein, the object is achieved by one or more devices for graphically visualizing data transfer on a first device for a first user that by means of the first device is visually experiencing a 3D virtual environment through a first person perspective, 1PP, field of view from a first virtual location in the 3D virtual environment. Said first device being configured to provide tracking between a real-world field of view orientation of the first user and said 1PP field of view in the 3D virtual environment. Said one or more devices are configured to identify a data transfer between a second device and a third device. The device(s) is further configured to graphically visualize, on the first user device, the identified data transfer in the 3D virtual environment as a graphical flow between a second virtual location, associated with the second device, in the 3D virtual environment and a third virtual location, associated with the third device, in the 3D virtual environment. The first user is thereby enabled to, through said 1PP field of view, visually experience the data transfer in the 3D virtual environment.

Embodiments herein and as described above support more user friendly and intuitive notification, monitoring, diagnosing and/or troubleshooting of data transfer, e.g. media exchange, between devices and/or users within 3D virtual environments, such as extended reality (XR) environments. In particularly when a device, e.g. the first device above, through which a user thereof is visually experiencing the 3D virtual environment, is configured to provide tracking between a real world field of view orientation of the first user and the 1PP field of view in the 3D virtual environment. As indicated in the introductory part, this else makes it difficult to get such information and understanding it, i.e. when experiencing and being in a context of the 3D virtual environment. Conventionally, often the user may have to remove some equipment, e.g. XR equipment, to be able to be informed about a data transfer, e.g. communication going on, especially if it is not part of communication that as such relate to the 3D virtual environment. For example if it does not relate to communication between users communicating with each other in the 3D virtual environment, such as when a data transfer relates to a device and/or user that is external from and is not e.g. using an application providing the 3D virtual environment.

Based on embodiments herein, a user of a 3D virtual environment may be notified about, monitor, diagnose and/or troubleshoot a data transfer, such as the first user above, without having to remove equipment for visually experiencing the 3D virtual environment, e.g. while staying in a virtual meeting room and participating in a meeting therein. The user, while experiencing the 3D virtual environment, may e.g. based on embodiments herein be able to understand current status of data transfers, identify sources and/or destinations of the data transfers, analyze, diagnose and/or troubleshoot data transfers, in a more convenient and intuitive manner than conventionally offered.

BRIEF DESCRIPTION OF THE DRAWINGS

Examples of embodiments herein are described in more detail with reference to the appended schematic drawings, which are briefly described in the following.

DETAILED DESCRIPTION

Figure 1:
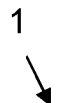
FIG. 1 is a block diagram schematically depicting an example communication system for providing a context in relation to which embodiments are described.
Figure 1:
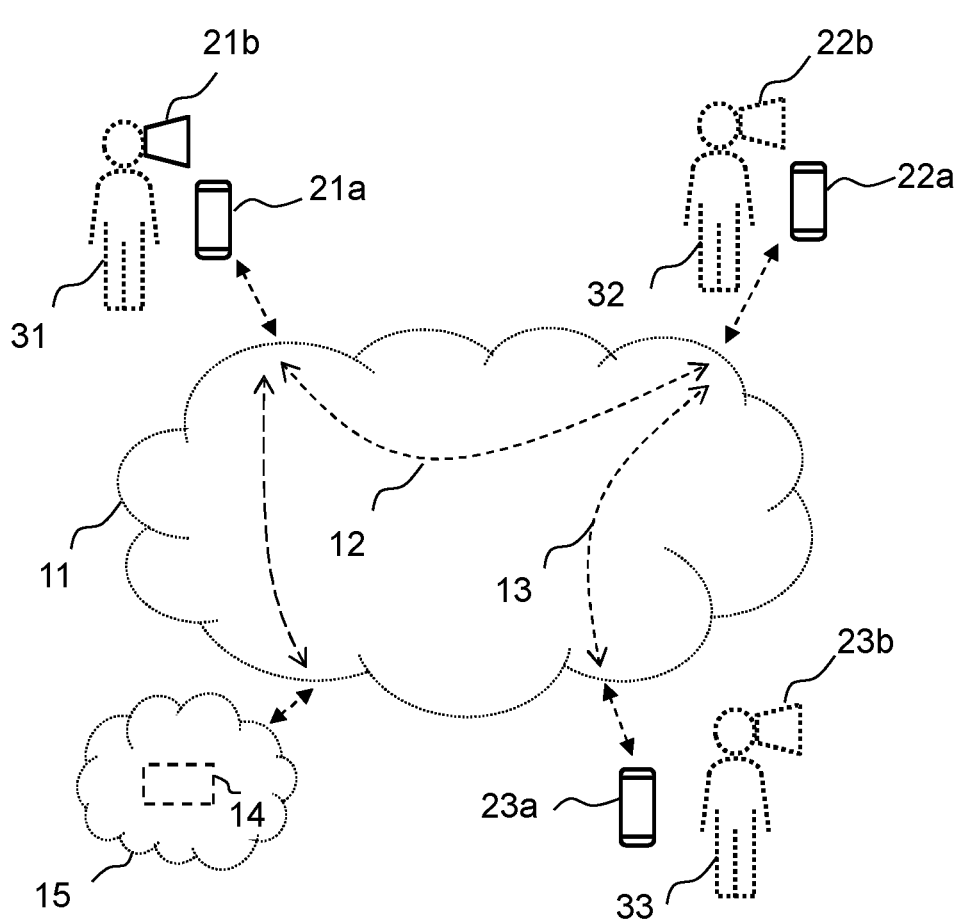

Throughout the following description similar reference numerals may be used to denote similar elements, units, modules, circuits, nodes, parts, items or features, when applicable. Features that appear only in some embodiments are, when embodiments are illustrated in a figure, typically indicated by dashed lines.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As part of the development of embodiments herein, the situation indicated in the Background will first be further elaborated upon.

In many existing video conferencing and/or chat applications, e.g. as mentioned in the Background, a first user involved in e.g. a text-chat can see, via the GUI, that another user is actually typing when writing something, such as responding to, the first user. Some applications further allow users being part of a group meeting, voice-only or video call, to see, via the GUI, which users that currently are active, e.g. are communicating in the meeting, even if it is not possible to hear or see what they are communicating. In some applications, a third user is allowed to see, via the GUI, not only that other, e.g. first and second, users are communicating, but also that they are communicating with each other. In these cases, communication is taking place within the application, between users of the application.

When in a video conference it may happen that a participating user, or rather a device of the user, also communicates with another user via the other user's device, which other user may or may not be in the video conference himself. This communication may be through the same or another application than the video conference application. In any case, from a user perspective this can be just as important to know about as communication going on between users within the video conference application. Likely a user using the video conferencing application is more prone to miss external communication just because it is external, and/or if attending to it, be more disturbed since it is yet another application and GUI involved. Also, it is not possible to see if other users in the video conferencing application are involved in similar external communication at their end.

It is furthermore hard for a user visually engaged in and experiencing a 3D virtual environment, e.g. engaged in a XR session, to receive and respond to messages, content etc. from other applications and/or devices. For example SMS, email, other communication data from a mobile phone, smartphone, and/or laptop etc. This may be particularly hard when the user is experiencing the 3D virtual environment through some XR gear, such as VR headset or similar, that provides said first person perspective field of view. With XR gear on it may even be difficult to notice presence of incoming "external" content and messages and even more difficult to identify and/or take part of such content. To notice and/or take part of such content a user may need to take off the XR gear and e.g. attend to and use another device and/or application. Furthermore, conventional VR applications do not allow a first user thereof and e.g. involved in a XR meeting/application to indicate to a second user not part of said XR session, that the first user is busy communicating, e.g. using a virtual keyboard and typing a message addressing the second user, e.g. send message or content to a user's smartphone etc. Similarly, conventional VR applications do not allow a first user thereof and e.g. involved in a XR meeting/application to be informed that e.g. a second user and/or device, is attempting to communicate, and/or is communicating with the user's device.

Based on the above, an idea underlying embodiments herein is to improve information a device, e.g. enabled by an application operative with, such as executing on, the device can mediate to a user that is visually experiencing a 3D virtual environment via the device, and which information is about communication to and/or from the user from other users/devices, and/or between other communicating users, where both communicating users and/or devices are represented in the 3D virtual environment, or if one of them is external from it, i.e. not represented in the 3D virtual environment, such as not participating in a 3D virtual environment for conferencing, e.g. XR meeting.

Since all communication correspond to and is based on data transfers, e.g. streams and/or packets of data, the solution that embodiment herein are based on, is to, within the 3D virtual environment, graphically visualizing such data transfers for the user in ways that utilize advantages provided by the 3D virtual environment and possibilities therein, and thereby solve problems with conventional solutions as indicated above.

Before describing and discussing embodiments herein further and in greater detail, an example system or setup will be described with users and devices communicatively connected to each other, and also an example scenario of how the users and devices may be physically located in relation not each other. This is for providing a context in relation to which embodiments herein will be described.

FIG. 1 is a block diagram schematically depicting an example communication system 1. The example is for providing a context in relation to which embodiments herein thereafter will be described.

Through a communication network 11, a first device 12, a second device 2 and a third device 23 are communicatively connected. Said devices may thus be referred to as communication devices, and/or user devices or equipment. Each of said devices may comprise one or several parts or units, e.g.

the first device 21 may comprise one or more device parts 21a,b that may be separate but connected units, e.g. one corresponding to a computer or smart phone and another corresponding to XR gear, such as a VR headset, AR glass(es) or lens(es), or similar. However, in some embodiments there is only one device part or unit, i.e. with everything integrated in one and the same device or unit, e.g. a single XR gear device. Also the devices 22, 23 may similarly comprise or consist of one or more device parts 22a,b and 23a,b. The first device 21 is associated with a first user 31 and the second and third devices may be associated with second and third users 32, 33, respectively. The first user 31 is by means of the first device 31, e.g. computer or smart phone, and/or XR gear that may correspond to device part 21b, enabled to visually experience a 3D virtual environment through a first person perspective (1PP) field of view from a first virtual location in a 3D virtual environment. The 3D virtual environment may be such environment as mentioned above and may be provided by an application executing on the first device 21 and/or on a supporting and/or managing server or similar. Said first device 21 may be configured to provide tracking between a real-world field of view orientation of the first user 31 and said 1PP field of view in the 3D virtual environment. The second and/or third devices 22, 23 may be similarly configured to enable the second and/or third users 32, 33 to visually experience the 3D virtual environment, typically from other perspectives, e.g. from second and third virtual locations therein.

The 3D virtual environment may thus be a multi-user environment, e.g. part of a 3D virtual meeting or conference environment, and/or may be a 3D virtual environment or room setup for some other reason to present information to the user that relate to communication between users and/or devices.

The communication network 11 may comprise one or more wireless communication networks, e.g. telecommunications networks, one or more computer networks, such as local area network and/or wide area networks, and may be connected to and/or be part of the Internet. In the communication network 11 there is shown an exemplary data transfer 12 between the first device 21 and the second device 22, and an exemplary data transfer 13 between the second device 22 and the third device 23. The data transfer may relate to data that is transmitted as part of communication between users of the involved devices, for example Media, such as text message(s), email, voice, video, or may relate to other data between devices, e.g. file(s) being downloaded etc. The communication may take part using one or more other applications executing on the involved devices that are separate from applications relating to the 3D virtual environment.

The figure also shows one or more further devices 14 and a further network 15. The further device(s) 14 and further network 15 may be located outside the communication network 11, i.e. be external as indicated in the figure, or alternatively (not indicated in the figure) be comprised in the communication network 11 and thus correspond to network device(s), e.g. server(s), such as a supporting and/or managing server(s), other network node(s) and/or a subnetwork of the communication network 100. The further device(s) 14 and further network 15 may be part of or correspond to a so-called computer cloud, often simply referred to as cloud, that may provide and/or implement services and/or functions for certain devices(s) connected to the communication network 100, and e.g. for certain application(s) executing on such device(s). For example, the further device(s) 14 and further network 15 may be involved in execution of software, including applications, involved in provision of the 3D virtual environment, where e.g. devices of users participating in 3D virtual environment may be served by the further device(s) 14 and/or further network. Additionally or alternatively the further device(s) 14 and further network 15, may be involved in implementation of embodiments herein. As should be realized by the skilled person from the below description, functionality for implementing embodiments herein may be added to existing software for provision of 3D virtual environments.

As used herein, 3D virtual environment may be a 3D virtual reality (VR), 3D augmented reality (AR) environment and/or mixed reality (MR) environment. Generally, the 3D virtual environment herein may be considered a 3D extended reality (XR) environment. As used herein, a 3D XR environment may be considered a mixed reality environment that is a mix or fusion between the real world and a virtual world. The mix may be between the real world and a virtual world that a user is experiencing with some connection therebetween. It may be described as an environment where digital, or virtual, things or objects have been brought into the physical world or that physical world objects have been brought into the virtual, or digital, world.

Figure 2:
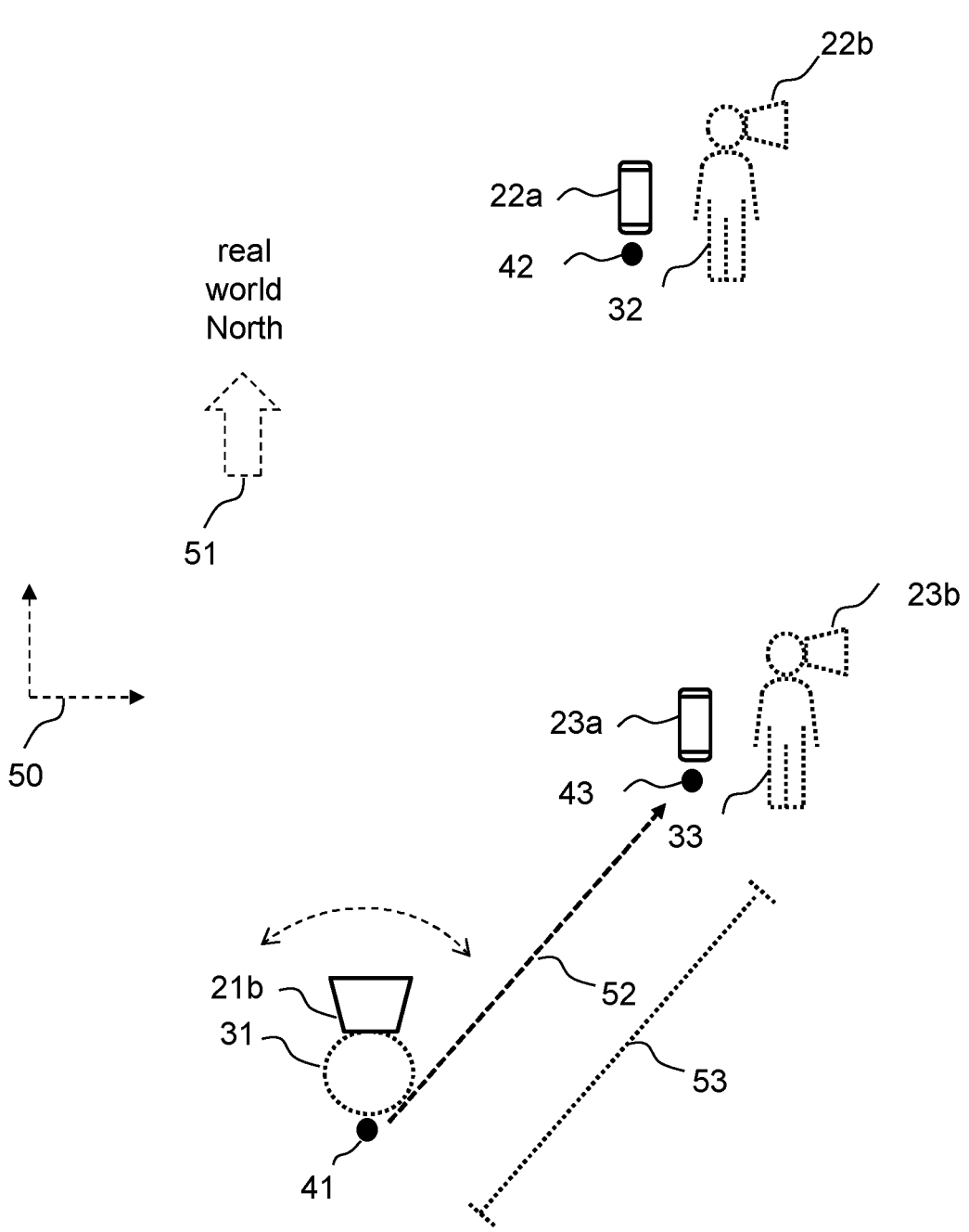
FIG. 2 is a block diagram schematically depicting an example scenario of how users and devices as in FIG. 1 may be physically located in relation not each other for providing a context in relation to which embodiments are described.

FIG. 2 is a block diagram schematically depicting an example scenario of how users and devices as in FIG. 1 may be physically located in relation to each other. This is for providing a context in relation to which embodiments herein will be described further below.

In the shown example scenario, a real-world cardinal direction 51 is shown, in the example corresponding to a real-world north direction, such as the magnetic north or geographical north. Users and devices as in FIG. 1 are shown at different physical locations and directions in relation to each other and said real word cardinal direction 51. The first device 21 and first user 31 is shown at a first physical location 41, the second device 22 and the second user 32 is shown at a second physical location 42 and the third device 23 and the third user 33 is shown at a third physical location 43. The third physical location 43 is thus located in a north-east direction (N-E), in the example corresponding to a real-world direction 52, from the first physical location 41. Similarly, the second physical location 42 is located in a north-north-east direction (NNE). There is a real-world distance 53 between the first physical location 41 and the third physical location 43. A suitable geographical, real world coordinate system 50 may be associated with the area that said devices and users are located. Said physical locations and also the relative directions may be expressed by coordinates in such coordinate system. For example, a vector corresponding to the difference in coordinates for the third physical location 43 and the first physical location 41 may be used to describe said NE direction.

In the figure, the first user 31 is shown with a top view perspective compared to in FIG. 1, with the first device 21 exemplified by the first device part 21*b*, e.g. a XR gear, such as VR headset. An arrow is shown in relation to the first device part 21*b* to illustrate that the first device 21 and the first user 31 may change field of view in the real world. As mentioned above, the first device 21 may be configured to provide tracking between a real-world field of view and said 1PP field of view in the 3D virtual environment. The real-world field of view may be determined or given by, or may correspond to, an orientation of the first user 31 or part thereof, e.g. head and/or eyes, and/or orientation of first device 21 or part thereof. In the shown example the first user may move the head to change real world field of view and this may be tracked by the device part 21*b*, such as a VR headset that moves with the head, whereby there is a change of the virtual field of view in the 3D virtual environment that the first user 31 is experiencing through the VR headset.

FIGS. 3A-D schematically show various example scenarios of 3D virtual environments that further below will be used for describing embodiments herein.

Figure 3A:
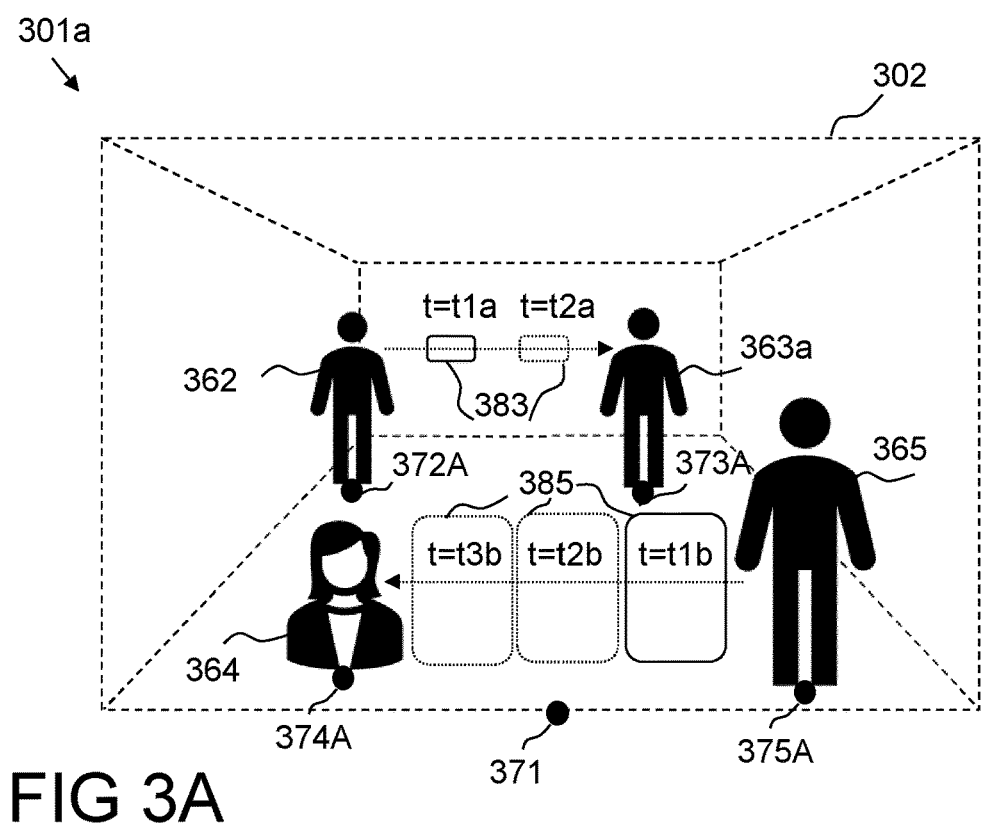
FIGS. 3A-D schematically show various example scenarios of 3D virtual environments used for describing embodiments.
Figure 3B:
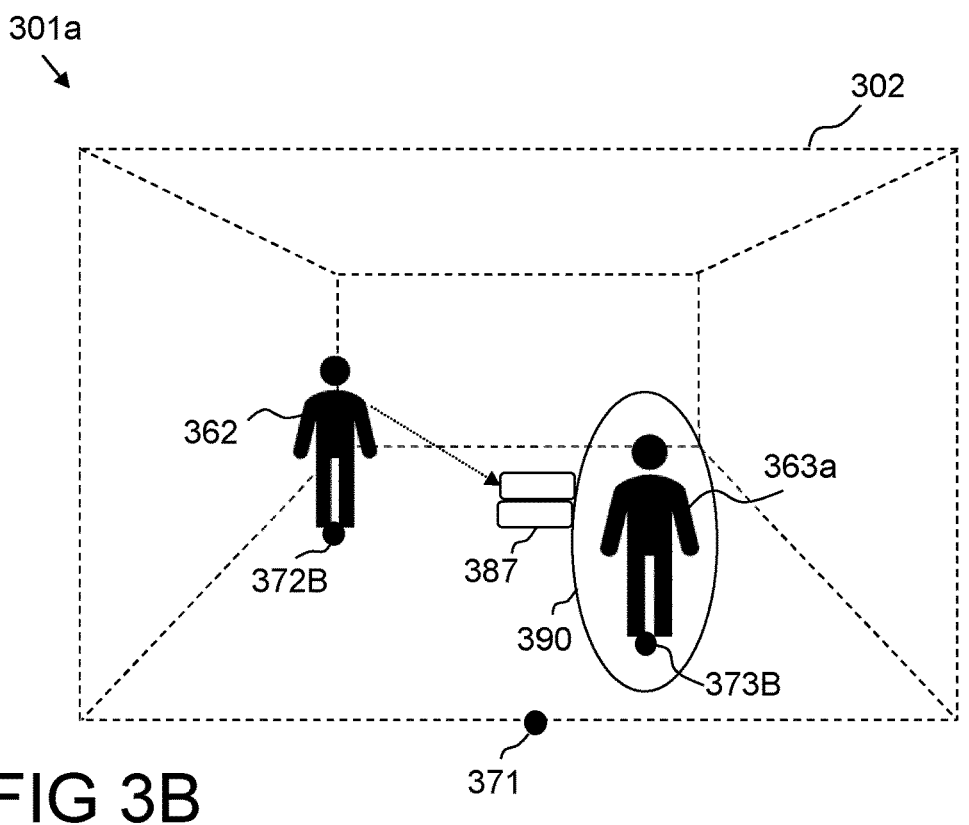

FIGS. 3A-B show an exemplary first scenario and exemplary second scenario, respectively, in a 3D virtual environment 301*a* through a first person perspective, 1PP, field of view 302 (schematically illustrated by dotted lines) from a first virtual location 371 in the 3D virtual environment 301*a*. The 1PP field of view is an example of how the first user 31, by means of the first device 21, can visually experience the 3D virtual environment 301*a*.

The 3D virtual environment 301*a* may have boundaries that are fully or partly invisible to users visually experiencing the environment, and these boundaries may fully or partly be graphically marked out, e.g. by walls, lines, etc. Alternatively the 3D virtual environment may be an open world, e.g. generated based on physical location of the first device 21 and first user 31, which may be the case if the 3D virtual environment is an AR environment. The 3D virtual environment typically has a coordinate system of its own (not shown in the figures). The boundaries and the 3D virtual environment as such may fully or partly be conventional. Embodiments herein are mainly about how information can be provided to user, e.g. the first user via the first device, that experiences a 3D virtual environment through e.g. XR gear.

The first virtual location 371, and other virtual locations used in examples herein, are shown in a 2D plane, e.g. corresponding to a ground plane in the 3D virtual environment 301*a*. However, embodiments herein are not limited to such virtual locations, although it may be preferred in some cases. The locations may alternatively be 3D locations, e.g. in a 3D coordinate system used for the 3D virtual environment.

The shown exemplary first and second scenarios of FIGS. 3A-B will be used below for describing some embodiments relating to how data transfers may be visualized to the first user experiencing the 3D virtual environment 301*a* through the 1PP field of view 302 from the exemplary first virtual location 371.

FIG. 3A shows four avatars, here graphical objects resembling persons, that correspond to and/or represent devices and/or users. The avatars, or more generally graphical objects, are thus graphical representation in the 3D virtual environment of devices and/or users. More specifically, there is a second avatar 362, representing the second user 32, at a second virtual location 372A, a third avatar 363*a*, representing the third user 33, at a third virtual location 373A, a fourth avatar 364 at a fourth virtual location 374A and a fifth avatar 365 at a fifth virtual location 375A. (Note that there is shown no first avatar in the figure since the first device 21 and first user 31 are associated with the 1PP field of view 302.) Further, there is schematically indicated a graphical flow 383, in the figure schematically identified by a box along an arrow at two time instants t1*a* and t2*a*. This is for indicating that the graphical flow 383 in fact is a movement of the box in direction of the arrow, i.e. the box "flows" or is in motion from the second avatar 362 and the second virtual location 372A towards the third avatar 363*a* and the third virtual location 373A. There is also shown a graphical flow 385, in the figure schematically identified by other boxes along another arrow at three time instants t1*b* and t2*b* and t3*b*. This is for indicating that the graphical flow 385 here corresponds to a movement or motion of graphical element or objects, here, said boxes, in direction of the arrow, i.e. there is a flow, i.e. motion, from the fifth avatar 365 and the fifth virtual location 375A towards the fourth avatar 364 and the fourth virtual location 374A, respectively.

FIG. 3B shows two avatars, the second avatar 362, now at a second virtual location 372B that is different from the second virtual location 372A, and the third avatar 363*a*, now at a third virtual location 373B that is different from the third virtual location 373A. There is further a graphical "non availability" indicator 390 shown in association with the third avatar 363*a* and third virtual location 373B, here in the form of an ellipse, or bubble, drawn around the third avatar 363*a* at the third virtual location 373B. The shown scenario illustrates an example of how it can be visualized if/when a data transfer directed to a device or user cannot reach the device or the attention of the user and therefore may be temporarily stored, buffered, and/or queued for delivery later when the device and/or user is available for revoicing and/or attending it. Data that is delivered and waiting external from the sender may be shown as illustrated in the figure by a graphical flow content 387 in a proximity of the virtual location and/or avatar of the recipient. The graphical flow content indicates content, such as graphical elements, here corresponding to boxes, that were part of a graphical flow graphically visualizing the data transfer. The boxes may thus be such boxes as described above in relation to FIG. 3A. Graphically visualized data, such as the graphical flow content 387, attempted to be delivered but that fails and/or cannot be received later by the device and/or user, may vanish. Another example to illustrate waiting data may be to change appearance of the avatar, e.g. that the avatar changes color or shape, e.g. increase in size, such as "swells", as more data is received but not read/consumed. An avatar with many unread inbound messages etc. may be illustrated by an enlarged version of the avatar whereas an avatar with less or no unread messages is illustrated at less or normal size and/or shape.

For example, a text message such as an SMS may be sent from the second device 22 and user 32 to the third device 23 and the third user 33 that is busy in a meeting in the 3D virtual environment 301*a* and therefore cannot receive or attend to the text message. The text message is for this reason shown with the graphical "non availability" indicator 390 in the 3D virtual environment 301*a*. One or more graphical elements, e.g. boxes that were flowing when the text message was sent towards the third avatar 363*a* and the third virtual location 373B, similar as for the graphical flow 383, may stop at the "non availability" indicator 390 and wait there until the third user 33 is available for receiving and/or attending the text message, whereby the "non avail- ability" indicator 390 is removed and the text message is delivered. An arrow, line or similar may be visualized from the second avatar 362 and second location 372B to the graphical element while it is waiting for delivery until the "non availability" indicator is removed. This way it is facilitated identification from where and to whom data, e.g. media such as message(s), have been sent and are waiting for delivery and/or attention.

Figure 3C:
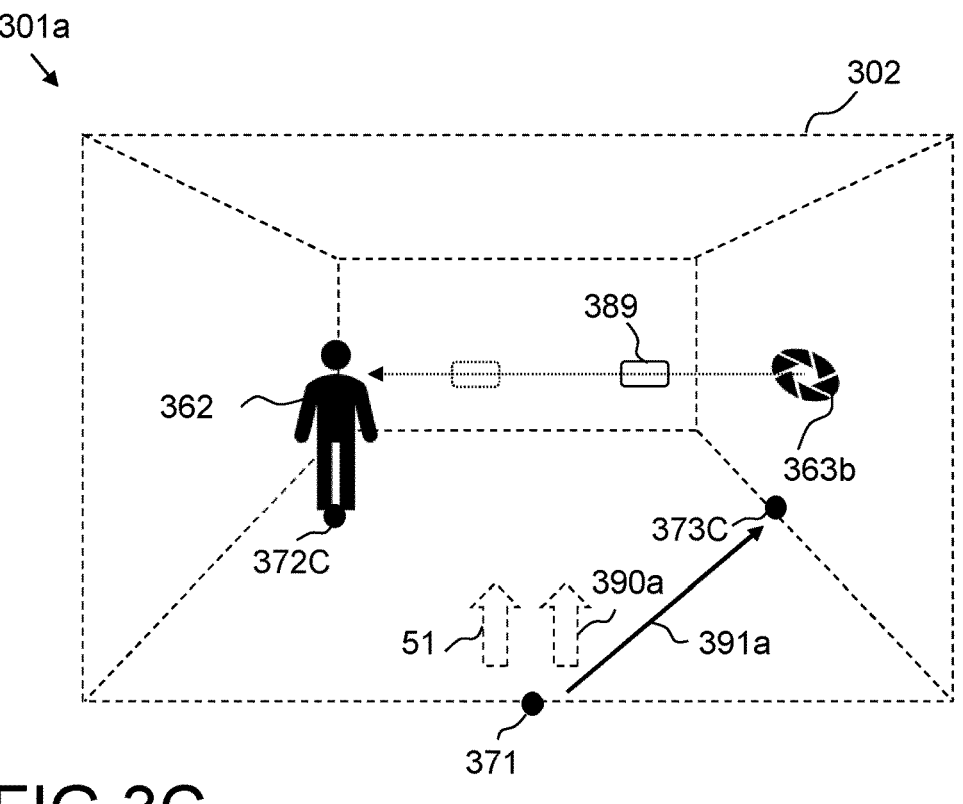

FIG. 3C shows an exemplary third scenario based on the 3D virtual environment 301*a* through the 1PP field of view 302 from the first virtual location 371 in the 3D virtual environment 301*a*. This scenario will be used below for describing some embodiments relating to how a data transfer can be visualized to and/or from a virtual location that is based on a physical location in the real world of a device involved in the data transfer. More specifically, FIG. 3C shows one avatar, the second avatar 362, at a second virtual location 372C. There is further a third graphical object 363*b*, here in the form of an opening at a third virtual location 373C. Also other forms or shapes of the third graphical object 363*b* are of course possible and an avatar can be used also in this situation. The third graphical object 363*b* may be considered to be instead of the third avatar 363*a* and is representing the third device 23 and/or third user 33. The third avatar 363*a* or another avatar representing the third device 23 or third user 33 could be used at the third virtual location 373C instead of the third graphical object 363*b*. It may be advantageous to represent and identify devices and/or users external from the 3D virtual environment 301*a* so that these are distinguishable from users represented in the 3D virtual environment. The exemplary scenario of FIG. 3C will be used for exemplifying embodiments relating to assignment of virtual location to represent location of a device and/or user in a 3D virtual environment, e.g. when there is not already representation of the device and/or user in the 3D virtual environment 301*a*. The figure also indicates the real-world cardinal direction 51 as an example reference, i.e. the real-world field of view is in this direction, which correspond to a virtual cardinal direction 390*a*. In other words, the 1PP field of view 302 in 3D virtual environment 301*a* here occurs when the real-world field of view is in the real-world cardinal direction 51.

The third virtual location 373C is in a direction 391*a* from the first virtual location 371. Details relating to this and relating embodiments are described below.

A graphical flow 389 is shown, which may correspond to the graphical flow 383 described above, but is here instead from the third graphical object 363*b* and the third virtual location 373C towards the second avatar 362 and the second virtual location 372C.

Figure 3D:
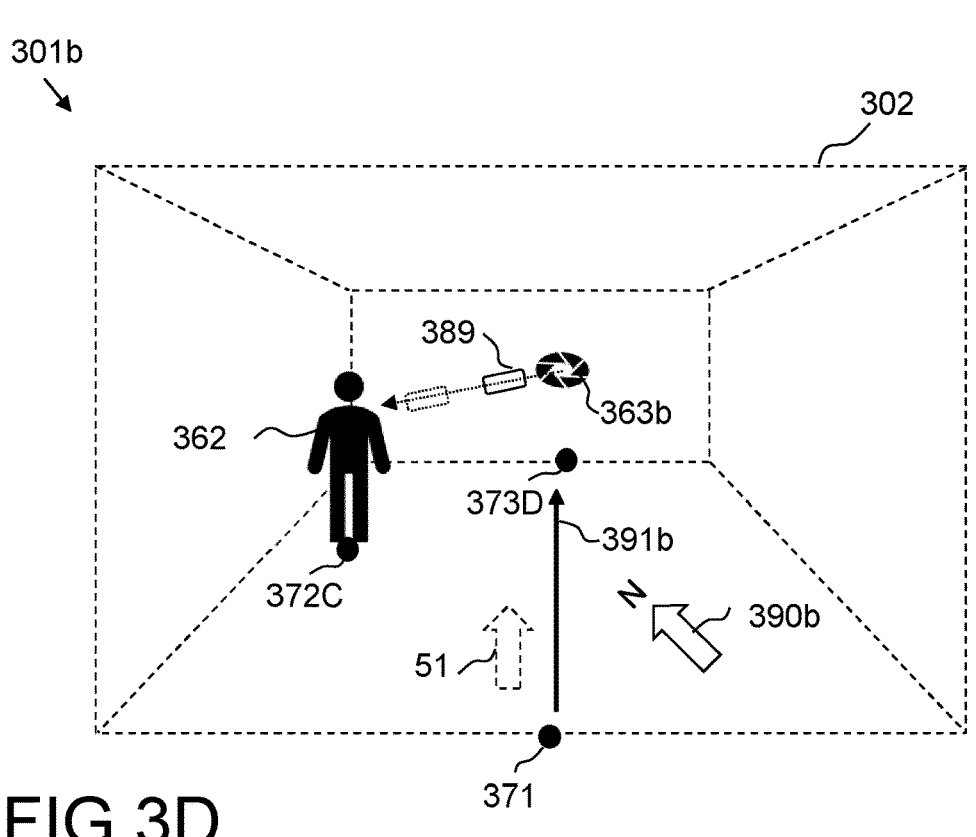

FIG. 3D shows an exemplary third scenario based on a 3D virtual environment 301*b*, which basically is the 3D virtual environment 301*a* with added graphical elements consisting of an added arrow pointing to letter "N", exemplifying a visual cardinal direction 390*b* in the 3D virtual environment 301*b* that except this may be the same as the 3D virtual environment 301*a*. The visual cardinal direction here thus corresponds to a virtual North direction, exemplifying a virtual cardinal direction.

Also the exemplary scenario of FIG. 3D will be used below for describing some embodiments relating to how a data transfer can be visualized to and/or from a virtual location that is based on a physical location in the real world of a device involved in the data transfer. Compared to FIG. 3C, the second avatar 362 is also here at the second virtual location 372C. Also the third graphical object 363*b* is shown but here at a third virtual location 373D that is different from third virtual location 373C in FIG. 3C. This scenario will also be used for exemplifying embodiments relating to assignment of virtual location to represent location of a device and/or user in a 3D virtual environment. Also here the figure indicates the real world cardinal direction 51 as example reference, i.e. the real world field of view is in this direction, or in other words, the 1PP field of view 302 in 3D virtual environment 301*b* occurs when the real world field of view is in the real world cardinal direction 51. The graphical flow 389 is here the same as in FIG. 3C and between the third graphical object 363*b* and the second avatar 362. The difference is the location of the third graphical object 363*b* that is at the virtual location 373D instead at the virtual location 373C as in FIG. 3C.

In the following, either one of the 3D virtual environ- ments 301*a*, 301*b* may be referred to as 3D virtual environ- ment 301 to simplify. Similarly, either one of the second virtual locations 372A-C may be referred to as 372, either one of the third virtual locations 373A-D may be referred to as 373 etc.

As should be realized, the boxes that in FIGS. 3A-D are used for illustrating graphical flow are just examples of graphical elements that may be used and that can be visualized as "flowing", and where each box or element may correspond to a data amount. Also other objects and/or forms than boxes may alternatively or additionally be used. In some cases the graphical flow may be a more continuous flow, similar to flow of water, where e.g. the width may indicate data amount or bandwidth. The speed of the flow and/or in combination with the size of boxes or width of flow, may indicate throughput.

How graphical flows like above may indicate information about the data transfer is further described below.

Figure 4:
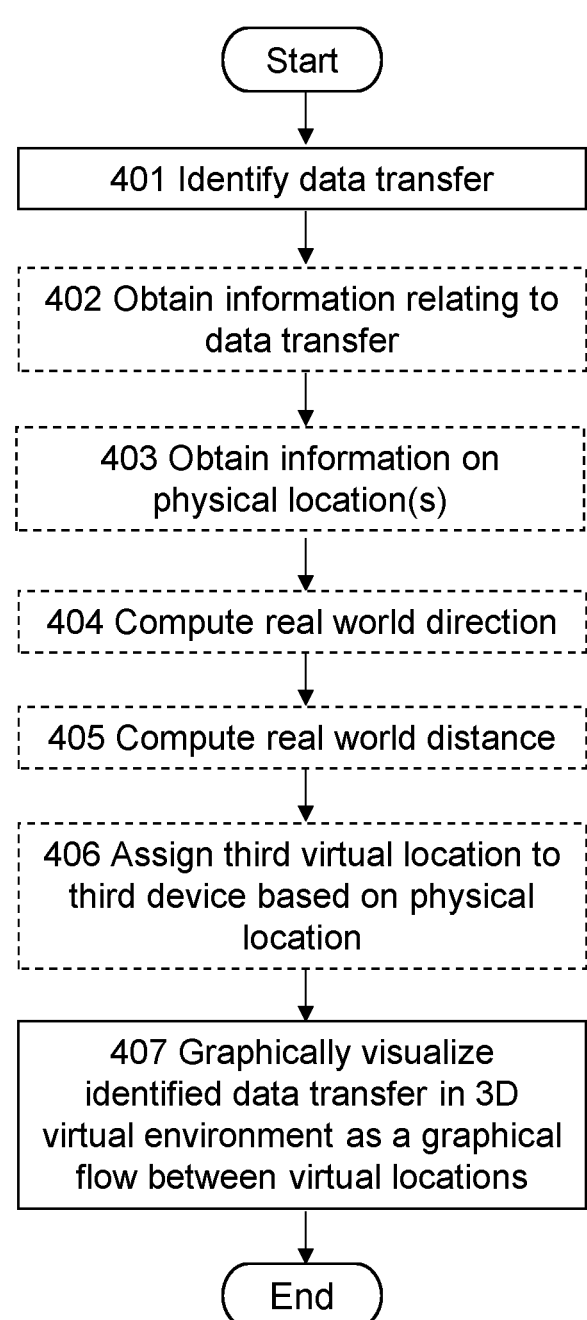
FIG. 4 is a flowchart schematically illustrating a method according to embodiments herein.

FIG. 4 is a flowchart schematically illustrating a method according to embodiments herein. The method is for graphically visualizing data transfer on a first device for a first user. In the following, the first device will be exemplified by the first device 21 and the first user by the first user 31. The first user 31 is by means of the first device 21 visually experiencing a 3D virtual environment through a 1PP field of view from a first virtual location in the 3D virtual environment. In the following, the 3D virtual environment is exemplified by the 3D virtual environment 301, the 1PP field of view by the 1PP field of view 302, and the first virtual location by the first virtual location 371. The first device 21 may be configured to provide tracking between a real-world field of view orientation of the first user 31 and said 1PP field of view 302 in the 3D virtual environment 301. The tracking may correspond to and/or be determined by a mapping between the real and virtual field of views. The real-world field of view orientation may be determined by body and/or head and/or eye orientation of the first user 31.

The method may be performed by one or more devices that may correspond to, comprise or be comprised in one or more of the following: the further device(s) 14, the further network 15, such as a supporting and/or managing server(s), e.g. such media transfer proxy server as mentioned below, the first device 21, smart phone, computer, XR gear, XR gear integrated with computer and/or corresponding functionality, etc.

The actions below that may form the method may be taken in any suitable order and/or be carried out fully or partly overlapping in time when this is possible and suitable.
Action 401

A data transfer is identified between a second device, and another, third device. In the following, the data transfer is exemplified by either one of the data transfers 12, 13, the second device by the second device 22 and the third device by the third device 23.

Said first device 21 may be located at a first physical location in the real world, said second device 22 may be located at a second physical location in the real world, and said third device may be located at a third physical location in the real world. In the following, the first physical location is exemplified by the first physical location 41, the second physical location by the second physical location 42, and the third physical location by the third physical location 43.

There may further be a second virtual location associated with or assigned to the second device 22 in the 3D virtual environment 301 and a third virtual location associated with or assigned to the third device 23 in the 3D virtual environment 301. In the following, the second virtual location is exemplified by the second virtual location 372 and the third virtual location by the third location 373. Association between a virtual location in a 3D virtual environment herein and a device may be visual in the 3D virtual environment, e.g. through a graphical object, such as an avatar, at the virtual location, such as exemplified herein in relation to FIGS. 3A-D, and which graphical object is graphically representing and may be identifying the device and/or user of the device in the 3D virtual environment.
Action 402

Information relating to said data transfer 12 or 13 may be obtained. The obtained information identifies one or more of following: a data rate of the data transfer, a type of data being transferred, a duration of the data transfer, bit rate of the data transfer, a latency of the data transfer, data transfer capabilities of the second and/or third device relevant for said data transfer, if the data transfer is encrypted or clear, quality of service (QoS) related to the data transfer, a priority of the data transfer, data transfer characteristics of the data transfer, a protection level associated with said data transfer, and size of data segments used in the data transfer. Examples of data transfer characteristics in the context of wireless communication include: multiple transmission layers, such as by rank, signal strength, coding, modulation, etc. Also underlaying attributes may be included and that may be of interest to visualize to a user as supplement or alternative to e.g. data rate.

How this kind of information may be used is exemplified below under Action 407.
Action 403

Information on, e.g. identifying, said physical locations of one or more of the devices involved, such as the second device 22 and/or the third device 23 and/or of the first device 21, may be obtained. For example Information identifying one or more of said physical locations 41-43. The information may be obtained from within the device(s) performing the method and/or received externally, e.g. from the device(s) that the physical locations(s) relate to, and/or from a positioning server, media transfer proxy server as described below, or similar. The information may be in any suitable format, for example be according to a suitable real-world coordinate system, such as the real-world coordinate system 50.
Action 404

A real-world direction may be computed based on said first physical location 41 and said third physical location 43. In the following, the computed real-world direction is exemplified by the real-world direction 52. The computed real-world direction 52 is thus a direction from the first physical location 41 towards the third physical location 43 where the third device 23 is located. How the computed real-world direction 52 may be used is exemplified below under Action 406.
Action 405

A real-world distance may be computed based on said first physical location 41 and said third physical location 43. In the following, the computed real-world distance is exemplified by the real-world distance 53, Said real world distance 53 thus being a distance between the first physical location 41 and the third physical location 43. How the computed real-world distance 52 may be used is exemplified below under Action 406.
Action 406

Said third virtual location 373 may be assigned to the third device 23 in the 3D virtual environment 301 based on at least said third physical location In embodiments with Action 404, said third virtual location 373 may be assigned to the third device 23 in the 3D virtual environment 301 based on the computed real-world direction 52. These embodiments are mainly for application when the third device is associated with, e.g. belongs to and/or is controlled, by a user that is not virtually represented in the 3D virtual environment, e.g. is not participating in a meeting taking part in the 3D virtual environment. Hence, these embodiments are typically only relevant when a device or user, e.g. the third device, involved in the data transfer has not already a virtual, typically graphical, representation in the 3D virtual environment. See e.g. the examples of FIGS. 3C-D. Else it may be more intuitive to show a graphical flow as in Action 407 below to/from already existing virtual representations in the 3D virtual environment instead, e.g. to/from a virtual location and/or avatar of a meeting participant. The present action may thus be performed in response to identification, or determination, that the third device 23 is not already associated with a virtual location in the 3D virtual environment 301, which would be the case if there was already a virtual, e.g. graphical, representation of the third 33 user therein.

In some of these embodiments, said third virtual location 373 is located in a virtual cardinal direction corresponding to said computed real world direction 52. In the following, the virtual cardinal direction is exemplified by the virtual cardinal direction 391, i.e. 391*a* or 391*b*. Hence, the first user 31 will through the first device 21 experience and identify the data transfer 13 as the graphical flow in Action 407 below to/from the third virtual location 373 that is located in a direction in the 3D virtual environment 301, i.e. said virtual cardinal direction 391, that corresponds to the direction where the third device 21 and third user 33 thereof are physically located. This will facilitate identifying from where and thereby also possibly from whom a data transfer comes from or is targeting. This will be particularly beneficial and user friendly when there is simultaneously graphically visualized several data transfers in the same 3D virtual environment and between many different virtual locations.

Said virtual cardinal direction 391 may correspond to said computed real world direction 52 by being determined in relation to one or more visual cardinal directions. In the following, said one or more visual cardinal directions are exemplified by the visual cardinal direction 390*b*. The visual cardinal direction 390*b* being visually indicated in and associated with the 3D virtual environment 301*b*. Said virtual cardinal direction 391 being determined so that it in relation to the visual cardinal direction 390*b* is the same cardinal direction as a real world cardinal direction corresponding to the computed real world direction 51. Note that said one or more visual cardinal directions thus may be independent from real world cardinal directions at the first physical location. For example: Assume that the third device 23 is located northeast from the first device 21 in the real world, i.e. as in FIG. 2, and the 3D virtual environment 301 is associated with, e.g. explicitly or implicitly identifies, a visual cardinal direction. Such explicit identification may be from graphical identification of the visual cardinal direction, e.g. a "north arrow", in the 3D virtual environment such as the visual cardinal direction 390*b* in the 3D virtual environment 301*b*, see e.g. FIG. 3D. Implicit identification may instead be from graphical identification of e.g. a sunset in a virtual direction that thus will be associated with west, whereby there is implicit graphical identification of west as visual cardinal direction in the 3D virtual environment. In both the explicit and implicit identification cases there will be visual indication of visual cardinal direction. The third virtual location 373 would in this example thus be located in direction of the (virtual) northeast in the 3D virtual environment, which may be determined in relation to said explicitly or implicitly visually identified visual cardinal direction (e.g. a marked out "north" or the sunset). This (virtual) northeast may in these embodiments thus not be the same as the real world north east.

Alternatively, said virtual cardinal direction 391 may correspond to said computed real world direction 51 by being the same as a real-world cardinal direction corresponding to the computed real-world direction 51. For example: Assume also here that the third device 23 is located northeast from the first device 21 in the real world, i.e. as in FIG. 2, but the 3D virtual environment 301 is not associated with any virtual cardinal direction, i.e. there exists no visual cardinal direction therein, and thus e.g. no virtual north identifiable in the 3D virtual environment. In this case the third virtual location 373C would be located in relation to the real-world cardinal direction and thus be located in a direction in the 3D virtual environment 301 that corresponds to the real-world northeast, see e.g. FIG. 3C. This may e.g. be preferred when the 3D virtual environment 301 is an AR environment where thus the real world and real-world directions are visible in the 3D virtual environment 301.

For embodiments as above and as shown in FIGS. 3C-D, where an external user is to be represented by a virtual location based on the users physical location, there may be provided a possibility to "opt-out" using the user's physical position for this purpose. In that case the application providing the 3D virtual environment and/or e.g. media transfer proxy as below should make sure that the physical location is not used or disclosed, for example that positioning data, e.g. IP-address space or other information identifying location, is not used as in these embodiments. Instead a "neutral" and/or predefined or random virtual location may be used.

In embodiments with Action 405, said third virtual location 373, e.g. 373C or 373D, may be assigned to the third device in the 3D virtual environment 301, based on the computed real-world distance 53. For example, there may be predefined or predetermined mapping between real world distances and distances in the 3D virtual environment 301 and the real-world distance 53 can thereby be reflected in the 3D virtual environment 301. The mapping need not necessarily be linearly scaled or be proportional. In case of several devices separate from the first device 21, e.g. also said second device 22 and third device 23, they may be assigned virtual locations so that any device closer to the first device 21 in the real world is also perceived as being closer to the first virtual location 371 in the 3D virtual environment 301. For example, if the third device 23 has less physical distance to the first device 21 than the second device 22, such as in FIG. 2, the third virtual location 373 may be assigned closer to the first virtual location 371 than the second virtual location 372.

Additionally or alternatively to the above it may be defined, predefined or predetermined that a physical location within a certain real area in the real world, e.g. corresponding to a real world location of a city or certain office, will always be assigned a virtual location in a certain virtual area in the 3D virtual environment 301 and that is associated with this city or office independent from how the third physical location 43, relates to the first physical location 41. There may be a graphically representation of said city or office in an area in the 3D virtual environment where the third device being located in said city or office will be assigned its virtual location.

Action 407

The identified data transfer 12 or 13 in the 3D virtual environment 301 is graphically visualized on the first user device 21 as a graphical flow, e.g. any one of graphical flows

385, 385, 389. The graphical flow is between the second virtual location 372 and the third virtual location 373, whereby the first user 31 through said 1PP field of view 302 can visually experience the data transfer 12 or 13 in the 3D virtual environment 301.

In some embodiments with Action 402, the graphical visualizing is further based on the information obtained in Action 402, such as according to one or more of the following examples: The flow being shown with a movement proportional to, e.g. scaled based on, the data rate. The flow being shown using graphical elements, e.g. shape and/or colors, associated with and/or identifying the type of data. The flow being shown during a time period based on, e.g. corresponding to, a duration of the data transfer. The flow being shown in association with graphical identification of said latency. The flow being shown using graphical elements sized based on, e.g. proportional to or scaled based on, the size of the data segments. The flow being shown using graphical elements, e.g. shape and/or colors, associated with and/or identifying the protection level of the data transfer, e.g. unencrypted or encrypted at certain level and/or certain type of encryption. The flow being shown in relation to the data transfer capabilities of the second and/or third devices, such as in relation to graphically shown available and/or assigned bandwidth for the data transfer, e.g. available bandwidth for the second and/or third devices.

In some embodiments, said second device 22 and/or the second user 32 thereof is graphically represented, e.g. by the second avatar 362, in the 3D virtual environment 301 at said second virtual location 372 that is different from said first virtual location 371. Hence, in this situation the first user 31 via the 1PP field of view 302 views the data transfer 13 visualized between the second device 22 and third device 23, which data transfer is not associated with the first user but with other users and/or physical locations.

However, in some embodiments of the method, as already indicated above, the second device 22 is the first device 21. Hence, for these embodiments, the second virtual location 372 is the same as the first virtual location 371, the second user 32 is the same as the first user 31 and the second physical location 42 is the same as the first physical location 41. These embodiments thus cover a situation where the first user 31 via the 1PP field of view 302 views the data transfer 12 between the first user 31 self and the third device 23 and/or the third user 33 thereof, e.g. by making sure that the third virtual location 372 is in the 1PP field of view 302. The data transfer 12 may thus here be seen as graphical flow to and/or from the 1PP field of view 302 in direction to/from the third virtual location 373.

Embodiments herein and as described above support more user friendly and intuitive notification, monitoring, diagnosing and/or troubleshooting of data transfer, e.g. media exchange, between devices and/or users within 3D virtual environments, such as extended reality (XR) environments. In particularly when a device, e.g. the first device 21, through which the first user 31 is visually experiencing the 3D virtual environment 301, is configured to provide tracking between a real world field of view orientation of the first user 31 and the 1PP field of view 302 in the 3D virtual environment 301. As indicated in the introductory part, it is else difficult for the user to get such information and understand it when experiencing and being in a context of a 3D virtual environment. Conventionally, often the user may have to remove some equipment, e.g. XR equipment, to be able to be informed about a data transfer, e.g. communication going on, especially if it is not part of communication that as such relate to the 3D virtual environment. For example if it does not relate to communication between users communicating with each other in the 3D virtual environment, such as when a data transfer relates to a device and/or user that is external from and is not using an application providing the 3D virtual environment.

Based on embodiments herein, a user of a 3D virtual environment may be notified about, monitor, diagnose and/or troubleshoot a data transfer, such as the first user above, without having to remove equipment for visually experiencing the 3D virtual environment, e.g. while staying in a virtual meeting room and participating in a meeting therein. The user, while experiencing the 3D virtual environment, is thereby enabled to better understand current status of ongoing data transfers, identify sources and/or destinations of the data transfers, analyze, diagnose and/or troubleshoot data transfers, in a more convenient and intuitive manner than conventionally offered.

First Specific Example

The following is a first detailed example based on the method and embodiments described above. It is assumed in this example that there is a 3D virtual environment, such as the 3D virtual environment 301 that is part of a communication application for a digital meeting or similar. There is internal communication going on therein originating from users that are using the application through their devices and are participating in one or more meetings in the 3D virtual environment. There may be a situation similar as the one with avatars as shown in FIG. 3A. The following actions, which may be performed as part of the method according to embodiments herein are in the following exemplified as performed by a managing server, e.g. corresponding to the further device 14. The example is about media directiveness to exemplify in some detail how data transfers and content can be visualized when it is between participants that are communicating in the 3D virtual environment. The managing server may e.g. host for a digital meeting with at least two meeting participants, e.g. corresponding to the first and/or second, and third users 31-33 above, that are interacting and communicating through user devices involving XR equipment, such as corresponding to said first, second and third devices 21-23.

Action 101

The managing server may receive feedback from managed devices, e.g. the first, second and/or third devices 21-23, regarding position of the devices and the participating users' relative positions in the 3D virtual environment 301, e.g. corresponding to a digital meeting "room".

Action 102

From the relative positions the managing server may determine in-between users' spatial distance in the 3D virtual environment, e.g. an in-XR distance, corresponding to a digital distance. The managing server may scale such digital distance in relation to "perceived physical distance" in the 3D virtual environment 301, such as length of the avatars, size of objects in room, e.g. chair, table, whiteboard, etc., room size, user mobility pattern (in-room movements), etc.

Action 103

The managing server may further detect outgoing media transfer action initiated by one of the users, e.g. initiation of the data transfer 13 between the second and third users 32, 33 with second and third devices 22, 23. This action may thus fully or partly correspond to Action 401.

Action 104

The managing server may determine type of media transmitted or being initiated to be transmitted. Such media type may be associated with text or certain type of text message, e.g. email, iMessage, SMS, etc., audio (speech), video, and/or in combination with haptics. This action may fully or partly correspond to Action 402.

Action 105

The managing server may determine targeted recipient of the media content.

Action 106

The managing server may determine, or obtain, or identify relation(s) between recipient and sender of the data transfer, such as business, formal, leisure, friends, colleagues, etc. This may be based on data gathered from calendar, mail, social media platforms, meeting topic/agenda, participants' titles, affiliations, geographical locality, hour of day, etc. For example, if the data transfer corresponds to the data transfer 13 and is from the second device 22 and the second user 32, to the third device 23 and the third user 33, said relations may be obtained for these users.

Action 107

The managing server may indicate there is an outgoing data transfer, e.g. media content such as message, from the sender, e.g. the second user 32 and/or may indicate propagation route, e.g. pointing vector, in the 3D virtual environment 301 for the data transfer from the sender to the recipient user. For example, the propagation route indicated, e.g. graphically, may correspond to the arrow shown for the boxes 383 in FIG. 3A, i.e. in a direction from the second avatar 362 and the second virtual location 372A to the third avatar 363a and the third virtual location 373A. This action may fully or partly correspond to or be comprised in Action 407.

Action 108

The managing server may associate a perceived data or media transfer time for the data transfer in the 3D virtual environment, i.e. from sender to recipient, with:

A perceived physical distance in the 3D virtual environment, e.g. in-XR distance, from sender to recipient, e.g. between the second virtual location 372A and the third virtual location 373A.

Estimated and/or measured sender to recipient user network bitrate performance capabilities e.g. in a transport network (TN) and/or wireless network, such as a WiFi-network or a Radio Access Network (RAN). The estimate and/or measurement may be made a priory, e.g. in respect to connected access, etc. For example, 200 Mb video clip conveyed over a 100 Mbps cellular connection would render "transmission delay" of 2 s per respective uplink for the sender and downlink for the recipient, and to that include a to/from estimated TN delay.

The present action may fully or partly relate to Action 407.

Action 109

The managing server may in respect to, e.g. based on or in relation to, said perceived physical distance, e.g. in-XR distance, size of media content transfer and relevant, e.g. TN, RAN, network capabilities, determine:

How many time segments, e.g. corresponding to time steps, said data transfer, e.g. a media file transfer, along said pointing vector may be divided into.

Associate a first time segment of transfer from sender to recipient along said pointing vector to a first time instance t, and a next segment to a later time instance t+1, etc., until a last segment is reached.

The time segments may correspond to the "width" of the boxes 383 or 385 in FIGS. 3A-B. Blurriness of segment, e.g. box, borders or edges may indicate variations. Sharper borders or edges may indicate smaller variations compared to more blurry borders or edges that may indicate larger variations. Variations may relate to variance in delay distributions during last x seconds, attempts, packets, etc.

The present action may fully or partly relate to Action 407.

Action 110

The managing server may associate a first graphical object at a first time t in accordance with a determined segment position along the pointing vector and at a later time t+delta a next graphical object at a position closer, e.g. by decreasing virtual distance by segment size time step, to the recipient. For example, the recipient in the 3D virtual environment 301 could be the fourth avatar 364 at the fourth virtual location 374A if there would be visualization like in FIG. 3A between devices and/or users represented by the fourth and fifth avatars, 364, 365 at virtual locations 374A and 375A. That is, a situation with the fifth avatar 365 representing the sender and the fourth avatar 364 representing the recipient. The graphical objects in this action may thus correspond to the boxes of the graphical flow 385 in FIG. 3A.

The present action may fully or partly relate to Action 407.

Action 111

The managing server may detect the sender's and/or recipient's virtual locations at also each of later time instances, e.g. t+delta, i.e. for a next time segment.

If the virtual locations, e.g. in-XR positions, have changed of either one of the sender or recipient, e.g. is greater than a certain threshold that may be predefined or predetermined, the managing server may:

Determine, e.g. compute, a new pointing vector direction in respect to the new virtual location(s) of the sender and/or recipient. This way the data transfer from the sender to the recipients may track and follow avatars or other graphical objects representing the sender and recipient in the 3D virtual environment even in the case any one or both is/are changing location in the 3D virtual environment 301 during the time the data transfer is graphically visualized therein. In some embodiments the update of position is made more often than for each time segment as above.

Assign a position of next graphical object segment, e.g. a next box, in accordance with updated virtual location(s), such as in-XR coordinates, for an updated position of the pointing vector from sender to recipient.

This way graphical flows such as 383, 385, 389, may follow or track also changing virtual locations, and e.g. moving avatars or graphical objects, during the time a data transfer is being visualized.

Action 112

The managing server may when an expected or computed transfer time for the data transfer, e.g. a media file, has expired and/or the recipient has indicated received content: Indicate for the sender that the data, e.g. media content such as message, has been received. This may be made by removing the graphical objects that have been used to visualize that data transfer in the 3D virtual environment 301, such as remove in-XR graphical objects indicating ongoing media transfer between sender and recipient.

Second Specific Example

The following is a second specific example based on the method and embodiments described above. It is assumed also in this example that the 3D virtual environment 301 is part of a communication application for a digital meeting or similar. In contrast to the first example it is here assumed that one of the recipient and sender involved in a data transfer is external, e.g. is not part of the meeting and typically not, at least not initially, represented in the 3D virtual environment. There may be a situation similar as any one of the example scenarios of FIGS. 3C-D. The following actions, which be performed as part of the method according to embodiments herein, by said one or more devices, are exemplified as performed by a managing server, e.g. corresponding to the further device 14. The managing server may host a digital meeting also in this example where with at least two meeting participants, e.g. corresponding to the first and second users 31-32 above, that may interact and communicate through devices involving XR equipment, such as corresponding to said first and second devices 21, 22. There is then a further, third device, e.g. the third device 23 with the third user 33 that is, as mentioned above, external, e.g. is not using the communication application and/or is at least not initially represented in the 3D virtual environment. The example is also here about media directiveness to exemplify in some detail how data transfers and content can be visualized in such situation.

With a data transfer involving an external party, e.g. inbound media transfer, to at least one external, such as non-XR, meeting participant and/or external device and/or user, a virtual in-XR distribution point or virtual location in the 3D virtual environment may be used and/or selected to serve as "transmission point" or "source point" for this external device and/or user. A pointing vector that may serve similar purpose and be used similarly as described above for the first example. That is, it is along the pointing vector the data transfer is graphically visualized and e.g. inbound media segments are to be moved. The other way around, said virtual in-XR distribution point may be selected to serve as target point for the pointing vector along which media segments are to be moved. For a meeting room, such inbound and/or outbound source point may e.g. be visualized as a communication access point, door opening, window, or similar. As should be realized, the transmission point, e.g. source and/or target point, may correspond to the third graphical object 363b above.

A user represented in the 3D virtual environment 301, such as an in-XR user, e.g. the second user 32 and second device 22 represented by the avatar 362 in the 3D virtual environment 301, may be up to receive an inbound data transfer, e.g. part of a communication session, media transfer, or alike from an external device and/or user, e.g. an externa communication party, such as the third device 23 and/or third user 33. The managing server may then indicate to an observing party in the 3D virtual environment, e.g. the first user 31 having the 1PP field of view 302 in the 3D virtual environment 301, such as XR meeting participant, from whom and geographically located where, the inbound data transfer comes from. The managing server may also associate a relevant direction to the data transfer and find suitable virtual location for a transmission point in the 3D virtual environment to represent the external third device and/or user in the 3D virtual environment.

For example, assume XR meeting participants A and B are located in same meeting in a 3D virtual environment 301 as above. User A is geographically located in her physical building with her local coordinate system (y-axis nose-aligned and x-axis at her right hand) turned a counter-clockwise (CC) angle phi with respect to e.g. a geographical coordinate system, such as a conventional North-South- East-West based coordinate system, e.g. the World Geodetic System (WGS) 84 coordinate system. User A's XR equipment may provide the managing server with said orientation of A's corresponding local coordinate system and updates of it, e.g. periodically or event driven, such as when it changes at a certain amount, e.g. above a predefined or predetermined threshold.

Participant B is geographically located at a position posB and is to be receiving a media message from a user Z that is not part of the ongoing XR meeting and geographically located at posZ. Given that the managing server, at the time of media transmission initiated from Z has information of respective positions of user Z and user B, the managing server may determine their relative (geographical) locations; e.g. user Z is located northeast of user B, and obviously that user B is located southwest of user Z, etc. To visualize, FIG. 2 may be used, with user B corresponding to the first user 31, the user Z corresponding to the third user 33 and user A corresponding to the second user 32.

From user A's perspective as being present in the XR meeting room together with user B, they may have certain relative in-XR orientations in respect to each other, i.e. in the 3D virtual environment, but given that a message inbound for user B e.g. from user Z (located geographically northeast with regard to user B) that direction in respect to user B in the meeting room may be interpreted and indicated in relation to user A's local coordinate system and its inherit relation and potential rotation to the geographical coordinate system.

Assuming that at a time instance t, user A, and hence her local coordinate system, is rotated 45° counterclockwise (CCW). With application of said 45° CCW rotation the SW inbound message vector from user Z in the geographical the ordinary N-S-E-W coordinate system, would correspond to a direction corresponding to "west" interpret in the local coordinate system for user A.

Then, for user A in her XR view, the message pointing vector and associated graphical objects would be translated towards user B in a direction "hitting user B" from the direction that corresponds to "from user A's right-hand side". XR-view here refers to such kind of 1PP field of view in the 3D virtual environment as described above. Correspondingly, the managing server then may describe an inbound message for user B to be indicated for user A in user A's XR view with e.g. "message inbound for B arriving from direction (as of pos B-to-posZ relative directions) in the corresponding real direction as user A is oriented with respect to, and the managing server may then correctly associate a correct inbound vector for B as it should be correctly located from A's perspective.

In embodiments herein, indications, such as graphical visualization in the 3D virtual environment 301 of an initiated, ongoing and/or performed data transfer between two devices and respective users of these devices, may or may not be visible to other users represented in the 3D virtual environment, e.g. to a third user participating in the same digital XR meeting in the 3D virtual environment.

If a data transfer, such as media transfer, between devices and users thereof is encrypted or e.g. marked or tagged as private, confidential or similar, the managing server may determine not to make graphically visualize the data transfer, at least not to users in the 3D virtual environment that are not involved in the data transfer, or that do not have sufficient rights, e.g. a sufficient security level.

Graphical visualization may further be based on meeting participant relation, such as determined under Action 106 and/or meeting type, e.g. based on type of meeting, private, business, and participants' status such as busy, in call, active, resting, etc.

Data transfer, such as media object transfer, notifications in addition what have been discussed above may be visual, audial, haptic, or combinations thereof.

It should be realized that embodiments herein with graphically visualized data transfers, e.g. media transfer, may be of the type one-to-one as in examples above but also can be one-to-many, etc., with graphical flows similarly as described above to each recipient.

Further, to support embodiments herein, especially with external user, i.e. not represented in the 3D virtual environment 301 and/or not participating via XR gear, but also in cases with any type of data transfer, e.g. communication, that is not as such supported may take part as communication within an application providing the 3D virtual environment, e.g. a meeting application and/or XR application, a media translation or transfer proxy server as below may be considered. The media transfer proxy server may enable users, e.g. the first user 31, to efficiently communicate also with users outside, i.e. external, of the 3D virtual environment, e.g. XR environment. That is, the first user 31 may be using an XR gear and the XR application and thereby experience and participate in the 3D virtual environment 301 but the other user, e.g. the third user 33, is not. The media transfer proxy server may e.g. correspond to said further device 14.

Supported type of data, e.g. media, from supported applications sending and/or receiving such data, may be transmitted through the media transfer proxy server or at least information about the data transfers. For example email, SMS, text document according to supported formats and/or from supported applications. The media transfer proxy server enables that such data and media, or at least information about data transfers of such data and media, to be used in the 3D virtual environment in addition to e.g. messaging already supported by the application providing the 3D virtual environment, e.g. a meeting application. When the media transfer proxy server receives supported type of data, i.e. media, from devices and/or users represented in or external from the 3D virtual environment, and/or from the application providing the 3D visual environment or other applications, it may:

Verify the incoming information, such as data and/or info about it with e.g. user preferences, supported applications, application types, supported media data and media types etc.

Determine if, and if so how, to convey data to the involved user(s) represented in the 3D virtual environment, e.g. XR meeting application.

Notify the relevant user(s), e.g. recipients, in the 3D virtual environment, e.g. by text, audio, graphically, and/or by haptic means.

When applicable enable the user(s) corresponding to recipients in the 3D virtual environment, e.g. XR user(s), to access the data, e.g. media, in the 3D virtual environment or at least within the application providing the 3D virtual environment.

The media transfer proxy server can thus be considered to correspond to an interface between an application or a platform providing the 3D virtual environment, e.g. an XR platform, and other, e.g. non-XR, applications and users on user devices.

The media transfer proxy server may keep track of content shared/sent to and from users in the 3D virtual environment, e.g. participating in an ongoing XR session.

The media transfer proxy server may detect type of content shared/sent between users in the 3D virtual environment, e.g. XR users, and external users, e.g. users not part of a XR session and e.g. not currently using an XR devices, but instead e.g. a device such as smartphones, computer, e.g. tablet PCs, desktop PC, smart watch, etc.

The media transfer proxy server may determine if/how to convey data to and from a user in the 3D virtual environment, e.g. a XR user, based on the said obtained user preferences, context and further relations to users that a media transfer relate to.

The media transfer proxy server may interface with an application or platform providing the 3D virtual environment, e.g. XR meeting platform, and negotiate if and how to exchange data to/from users in the 3D virtual environment, e.g. XR users. For example to determine if/how to convey data based on receiving users' capabilities in terms of device type, content type, application requirements, user context, meeting context, user environment, etc.

The media transfer proxy server may enable users in the 3D virtual environment, i.e. that are experiencing the 3D virtual environment, e.g. XR users, to efficiently communicate both with users represented in the 3D virtual environment, e.g. in an XR session, and users, e.g. meeting participants, external or outside from the 3D virtual environment or XR session. This may be done by e.g. translating XR-gear rendered data with respect to non-XR recipient's gear.

The media translation proxy server may determine if and how to convey data to an XR user, i.e. a user using the application and experiencing the 3D virtual environment. The determination may be based on one or more of the following:

User preferences, e.g. users and apps that are allowed to be forwarded when said user is participating in the 3D virtual environment, e.g. is engaged in a XR session Applications and datatypes that are supported by the application Receipt and/or exchange of connect and handshake data with the application Ability to notify an XR-user about incoming data, e.g. using text, audio, visual, haptics or combinations thereof via XR gear Ability of the application to incapsulate said data to be accessible by said user in the 3D virtual environment, e.g. when engaged in a XR session The media translation proxy server may further determine if and how to convey data from an XR user, i.e. a user using the application and experiencing the 3D virtual environment. The determination may be based on one or more of the following:

Preferences of receiving external users(s), i.e. not represented in the 3D virtual environment, such as non-XR user's preference, e.g. users and apps that are allowed to be transferred when e.g. said external user is engaged in an XR session but not equipped with XR gear Applications and datatypes that are supported by other, e.g. on-XR, applications and devices and equipment Connect and handshake capabilities, preferences, etc. regarding both the application providing the 3D virtual environment, e.g. XR application, and other involved applications, e.g. non-XR applications.

Figure 5:
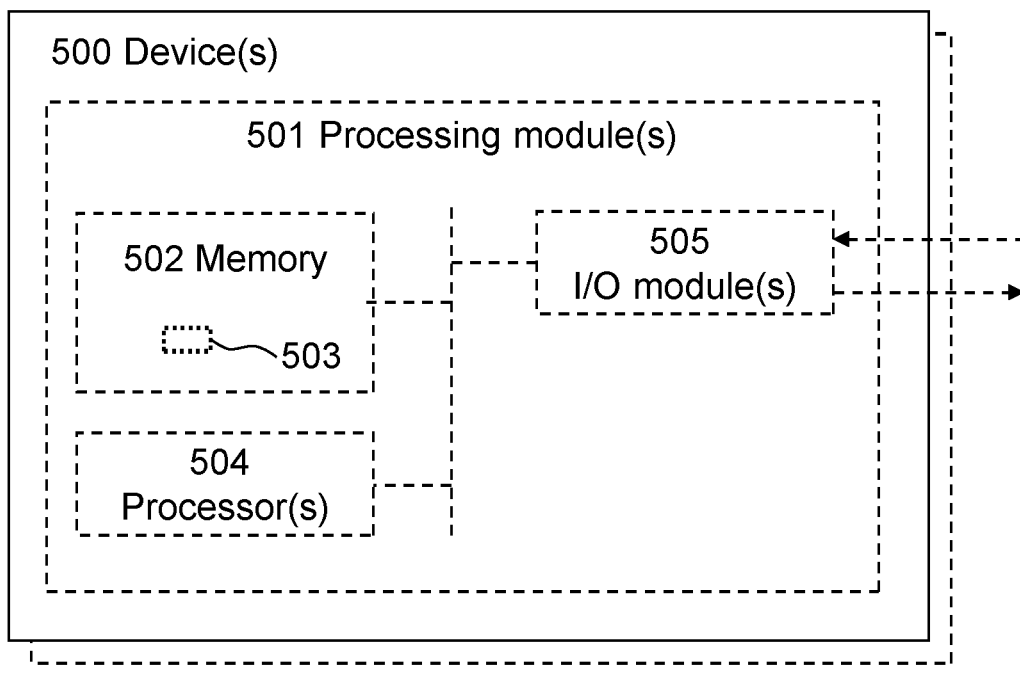
FIG. 5 is a schematic block diagram for illustrating embodiments of how one or more devices may be configured to perform the method and actions discussed in connection with FIG. 4

FIG. 5 is a schematic block diagram for illustrating embodiments of how one or more devices 500 may be configured to perform the method and actions discussed above in connection with FIG. 4. The devices(es) 500 may e.g. fully or partly correspond to, comprise or be comprised in the further device(s) 14, such as a supporting and/or managing server(s) and/or such media transfer proxy server as mentioned above, the further network 15, the first device 21, smartphone, tablet, computer, XR gear, XR gear integrated with computer or having computer capabilities, etc.

Hence, said device(s) 500 is for graphically visualizing the data transfer. 12 or 13 on the first device 21 for the first user 31 that by means of the first device 21 is visually experiencing the 3D virtual environment 301 through the 1PP field of view 302 from the first virtual location 371 in the 3D virtual environment 301. The first device 21 may be configured to provide tracking between a real-world field of view orientation of the first user 31 and said 1PP field of view 302 in the 3D virtual environment 301.

The device(s) 500 may comprise processing module(s) 501, such as a means, one or more hardware modules, including e.g. one or more processors, and/or one or more software modules for performing said method and/or actions.

The device(s) 500 may further comprise memory 502 that may comprise, such as contain or store, computer program(s) 503. The computer program(s) 503 comprises 'instructions' or 'code' directly or indirectly executable by the device(s) 500 to perform said method and/or actions. The memory 502 may comprise one or more memory units and may further be arranged to store data, such as configurations and/or applications involved in or for performing functions and actions of embodiments herein.

Moreover, the device(s) 500 may comprise processor(s) 504, i.e. one or more processors, as exemplifying hardware module(s) and may comprise or correspond to one or more processing circuits. In some embodiments, the processing module(s) 501 may comprise, e.g. 'be embodied in the form of' or 'realized by' processor(s) 504. In these embodiments, the memory 502 may comprise the computer program(s) 503 executable by the processor(s) 504, whereby the device(s) 500 is operative, or configured, to perform said method and/or actions thereof.

Typically the device(s) 500, e.g. the processing module(s) 501, comprises Input/Output (I/O) module(s) 505, configured to be involved in, e.g. by performing, any communication to and/or from other units and/or devices, such as sending and/or receiving information to and/or from other devices. The I/O module(s) 505 may be exemplified by obtaining, e.g. receiving, module(s) and/or providing, e.g. sending, module(s), when applicable.

Further, in some embodiments, the device(s) 500, e.g. the processing module(s) 501, comprises one or more of an identifying module(s), graphically visualizing module(s), obtaining module(s), computing module(s), assigning module(s) as exemplifying hardware and/or software module(s) for carrying out actions of embodiments herein. These modules may be fully or partly implemented by the processor(s) 504.

Hence:

The device(s) 500, and/or the processing module(s) 501, and/or the processor(s) 504, and/or the I/O module(s) 505, and/or the identifying module(s) are thus operative, or configured, to identify said data transfer 12 or 13 between said second device 22 and said third device 23.

The device(s) 500, and/or the processing module(s) 501, and/or the processor(s) 504, and/or the I/O module(s) 505, and/or the graphically visualizing module(s) are further operative, or configured, to graphically visualize, on the first user device 21, the identified data transfer 12 or 13 in the 3D virtual environment 101 as said graphical flow 385, 385, or 389.

In some embodiments, the device(s) 500, and/or the processing module(s) 501, and/or the processor(s) 504, and/or the I/O module(s) 505, and/or the obtaining module(s) are operative, or configured, to obtain said information relating to said data transfer 12 or 13.

In some embodiments, the device(s) 500, and/or the processing module(s) 501, and/or the processor(s) 504, and/or the I/O module(s) 505, and/or the assigning module(s) are operative, or configured, to assign said third virtual location 373 to the third device 23 based on at least said third physical location 43.

In some embodiments, the device(s) 500, and/or the processing module(s) 501, and/or the processor(s) 504, and/or the I/O module(s) 505, and/or the computing module(s) are operative, or configured, to compute, based on said first physical location 41 and said third physical location 43, said real world direction 52.

In some embodiments, the device(s) 500, and/or the processing module(s) 501, and/or the processor(s) 504, and/or the I/O module(s) 505, and/or the computing module(s) are operative, or configured, to compute, based on said first physical location 41 and said third physical location 43, said real world distance 53.

Figure 6:
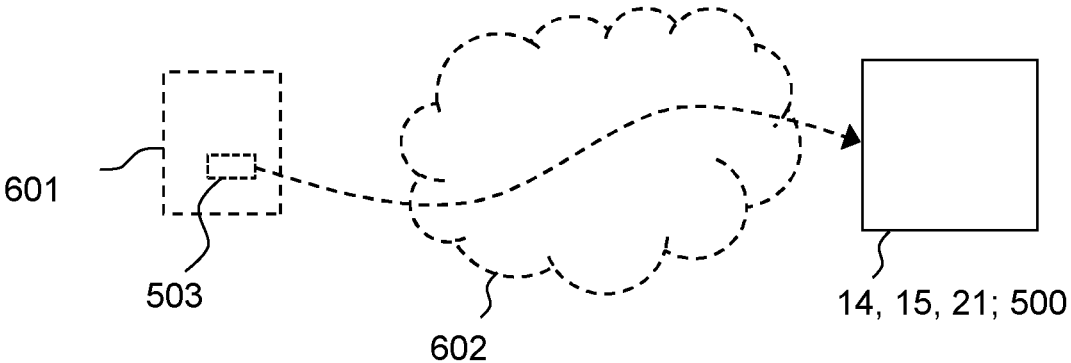
FIG. 6 is a schematic drawing illustrating some embodiments relating to computer program(s) and carriers thereof to cause the device(s) to perform said method and related actions.

FIG. 6 is a schematic drawing illustrating some embodiments relating to computer program(s) and carriers thereof to cause said device(s) 500 discussed above to perform said method and related actions. The computer program(s) may be the computer program(s) 503 and comprises instructions that when executed by the processor(s) 504 and/or the processing module(s) 501, cause the device(s) 500 to perform as described above. In some embodiments there is provided carrier(s), or more specifically data carrier(s), e.g. computer program product(s), comprising the computer program(s). Each carrier may be one of an electronic signal, an optical signal, a radio signal, and a computer readable storage medium, e.g. a computer readable storage medium or media 601 as schematically illustrated in the figure. The computer program(s) 503 may thus be stored on such computer readable storage medium 601. By carrier may be excluded a transitory, propagating signal and the data carrier may correspondingly be named non-transitory data carrier. Non-limiting examples of the data carrier(s) being computer readable storage medium or media is a memory card or a memory stick, a disc storage medium, or a mass storage device that typically is based on hard drive(s) or Solid State Drive(s) (SSD). The computer readable storage medium or media 601 may be used for storing data accessible over a computer network 602, e.g. the Internet or a Local Area Network (LAN). The computer program(s) 503 may furthermore be provided as pure computer program(s) or comprised in a file or files. The file or files may be stored on the computer readable storage medium or media 601 and e.g. available through download e.g. over the computer network 602 as indicated in the figure, e.g. via a server. The file or files may e.g. be executable files for direct or indirect download to and execution on said device(s) 500 to make it or them perform as described above, e.g. by execution by the processor(s) 504. The file or files may also or alternatively be for intermediate download and compilation involving the same or another processor(s) to make them executable before further download and execution causing said device(s) 500 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make any node(s), device(s), device(s), network(s), system(s), etc. to be configured to and/or to perform the above-described methods and actions.

Identification by any identifier herein may be implicit or explicit. The identification may be unique in a certain context, e.g. in the wireless communication network or at least in a relevant part or area thereof.

Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may e.g. mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method for graphically visualizing data transfer on a first device for a first user that by means of the first device is visually experiencing a 3D virtual environment through a first person perspective (1PP) field of view from a first virtual location in the 3D virtual environment, wherein said first device is configured to provide tracking between a real world field of view orientation of the first user and said 1PP field of view in the 3D virtual environment, and wherein the method comprises:

identifying a data transfer between a second device and a third device, and graphically visualizing, on the first user device, the identified data transfer in the 3D virtual environment as a graphical flow between a second virtual location, associated with the second device, in the 3D virtual environment and a third virtual location, associated with the third device, in the 3D virtual environment, wherein the first user through said 1PP field of view can visually experience the data transfer in the 3D virtual environment.

2. The method of claim 1, wherein he method further comprises:

obtaining information relating to said data transfer, which information is identifying one or more of following: a data rate of the data transfer, a type of data being transferred, a duration of the data transfer, bit rate of the data transfer, a latency of the data transfer, data transfer capabilities of the second and/or third device relevant for said data transfer, a protection level associated with said data transfer, and size of data segments used in the data transfer, and wherein said graphical visualization is further based on the obtained information.

3. The method of claim 1, wherein said first device is located at a first physical location in the real world, said second device is located at a second physical location in the real world and said third device is located at a third physical location in the real world, and wherein the method further comprises:

assigning said third virtual location to the third device based on at least said third physical location.

4. The method of claim 3, wherein the method further comprises:

computing, based on said first physical location and said third physical location, a real world direction that is a direction from the first physical location towards the third physical location where the third device is located, and wherein said third virtual location is assigned to the third device in the 3D virtual environment based on the computed real world direction.

5. The method of claim 4, wherein said third virtual location is located in a virtual cardinal direction corresponding to said computed real world direction.

6. The method of claim 5, wherein said virtual cardinal direction corresponds to said computed real world direction by being determined in relation to one or more visual cardinal directions visually indicated in and associated with the 3D virtual environment so that said virtual cardinal direction in relation to said one or more visual cardinal directions is the same cardinal direction as a real world cardinal direction corresponding to the computed real world direction.

7. The method of claim 5, wherein said virtual cardinal direction corresponds to said computed real world direction by being the same as a real-world cardinal direction corresponding to the computed real-world direction.

8. The method of claim 3, wherein the method further comprises:

computing, based on said first physical location and said third physical location, a real world distance that is a distance between the first physical location and the third physical location, and wherein said third virtual location is assigned to the third device in the 3D virtual environment based on the computed real world distance.

9. The method of claim 1, wherein the second device is the first device.

10. The method of claim 1, wherein the second device and/or a second user thereof is graphically represented in the 3D virtual environment at said second virtual location that is different from said first virtual location.

11. A non-transitory computer readable storage medium storing a program comprising instructions that when executed by one or more processors causes a device to perform the method of claim 1.

12. An apparatus for graphically visualizing data transfer on a first device for a first user that by means of the first device is visually experiencing a 3D virtual environment through a first person perspective (1PP) field of view from a first virtual location in the 3D virtual environment, wherein said first device is configured to provide tracking between a real world field of view orientation of the first user and said 1PP field of view in the 3D virtual environment, and wherein said apparatus is configured to:

identify a data transfer between a second device and a third device, and graphically visualize, on the first user device, the identified data transfer in the 3D virtual environment as a graphical flow between a second virtual location, associated with the second device, in the 3D virtual environment and a third virtual location, associated with the third device, in the 3D virtual environment, wherein the first user through said 1PP field of view can visually experience the data transfer in the 3D virtual environment.

13. The apparatus of claim 12, further configured to:

obtain information relating to said data transfer, which information is identifying one or more of following: a data rate of the data transfer, a type of data being transferred, a duration of the data transfer, bit rate of the data transfer, a latency of the data transfer, data transfer capabilities of the second and/or third device relevant for said data transfer, a protection level associated with said data transfer, and size of data segments used in the data transfer, and wherein said graphical visualization is further based on the obtained information.

14. The apparatus of claim 12, wherein said first device is located at a first physical location in the real world, said second device is located at a second physical location in the real world and said third device is located at a third physical location in the real world, and wherein the apparatus is further configured to:

assign said third virtual location to the third device based on at least said third physical location.

15. The apparatus of claim 14, wherein the apparatus is further configured to:

compute, based on said first physical location and said third physical location, a real world direction that is a direction from the first physical location towards the third physical location where the third device is located, and wherein said third virtual location is assigned to the third device in the 3D virtual environment based on the computed real world direction.

16. The apparatus of claim 15, wherein said third virtual location is located in a virtual cardinal direction corresponding to said computed real world direction, and said virtual cardinal direction corresponds to said computed real world direction by being determined in relation to one or more visual cardinal directions visually indicated in and associated with the 3D virtual environment so that said virtual cardinal direction in relation to said one or more visual cardinal directions is the same cardinal direction as a real world cardinal direction corresponding to the computed real world direction.

17. The apparatus of claim 15, wherein said third virtual location is located in a virtual cardinal direction corresponding to said computed real world direction, and said virtual cardinal direction corresponds to said computed real world direction by being the same as a real world cardinal direction corresponding to the computed real world direction.

18. The apparatus of claim 14, wherein the apparatus is further configured to:

compute, based on said first physical location and said third physical location, a real world distance that is a distance between the first physical location and the third physical location, and wherein said third virtual location is assigned to the third device in the 3D virtual environment based on the computed real world distance.

19. The apparatus of claim 12, wherein the second device is the first device.

20. The apparatus of claim 12, wherein the second device and/or a second user thereof is graphically represented in the 3D virtual environment at said second virtual location that is different from said first virtual location.

* * * * *